US010803397B2

(12) United States Patent
Desikachari et al.

(10) Patent No.: US 10,803,397 B2
(45) Date of Patent: Oct. 13, 2020

(54) APPLICATION BEHAVIOR LEARNING BASED CAPACITY FORECAST MODEL

(71) Applicant: Appnomic Systems Private Limited, Bangalore (IN)

(72) Inventors: Padmanabhan Desikachari, Bangalore (IN); Sumanth Narasappa, Bangalore (IN)

(73) Assignee: Appnomic Systems Private Limited, Bangalore (IN)

(*) Notice: Subject to any disclaimer, the term of this patent is extended or adjusted under 35 U.S.C. 154(b) by 1298 days.

(21) Appl. No.: 14/304,760

(22) Filed: Jun. 13, 2014

(65) Prior Publication Data

US 2015/0310139 A1 Oct. 29, 2015

(30) Foreign Application Priority Data

Apr. 25, 2014 (IN) ............................ 2109CHE2014

(51) Int. Cl.
*G06N 20/00* (2019.01)
*G06Q 10/06* (2012.01)
*G06Q 10/04* (2012.01)

(52) U.S. Cl.
CPC ............ *G06N 20/00* (2019.01); *G06Q 10/04* (2013.01); *G06Q 10/06* (2013.01); *G06Q 10/0631* (2013.01); *G06Q 10/06315* (2013.01)

(58) Field of Classification Search
CPC ...... G06N 99/005; G06N 20/00; G06Q 50/00; G06Q 10/04; G06Q 10/06; G06Q 10/0631; G06Q 10/06315
USPC .......................................................... 706/12
See application file for complete search history.

(56) References Cited

U.S. PATENT DOCUMENTS 8,732,307 B1 * 5/2014 Zhu .................. H04L 29/08144 709/226
9,081,623 B1 * 7/2015 Magerramov ............ G06F 9/50
2005/0107997 A1 * 5/2005 Watts .................. G06F 11/3419 703/21
2006/0179136 A1 * 8/2006 Loboz ................ G06F 11/3409 709/224
2006/0223495 A1 * 10/2006 Cassett ................ H04L 43/026 455/405
2010/0153330 A1 * 6/2010 Desikachari ........ G06F 11/3433 706/59

* cited by examiner

*Primary Examiner* — Kamran Afshar
*Assistant Examiner* — Marshall L Werner
(74) *Attorney, Agent, or Firm* — Van Pelt, Yi & James LLP

(57) ABSTRACT

Various techniques employed by an application performance management service to generate an application behavior learning based capacity forecast model are disclosed. In some embodiments, such a capacity forecast model is at least in part generated by clustering collected transaction data into one or more usage patterns, analyzing collected usage pattern data, and solving a mathematical model generated from the usage pattern data to determine a sensitivity of a resource to each type of transaction associated with an application.

45 Claims, 4 Drawing Sheets

300

302 collect transaction data 304 cluster transaction data to identify usage patterns 306 collect usage pattern data 308 analyze usage pattern data 310 build capacity forecast model

APPLICATION BEHAVIOR LEARNING BASED CAPACITY FORECAST MODEL

This application claims priority to India Patent Application No. 2109/CHE/2014 entitled APPLICATION BEHAVIOR LEARNING BASED CAPACITY FORECAST MODEL, filed Apr. 25, 2014, which is incorporated herein by reference for all purposes.

BACKGROUND OF THE INVENTION

Application owners typically plan capacity additions based on resource consumption trends at infrastructure layers. Such techniques for adding capacity often lead to oversized infrastructures comprising wasted resources and/or bottlenecks at critical points in infrastructures that increase the likelihood of performance issues or outages with growth.

BRIEF DESCRIPTION OF THE DRAWINGS

Various embodiments of the invention are disclosed in the following detailed description and the accompanying drawings.

DETAILED DESCRIPTION

Figure 1:
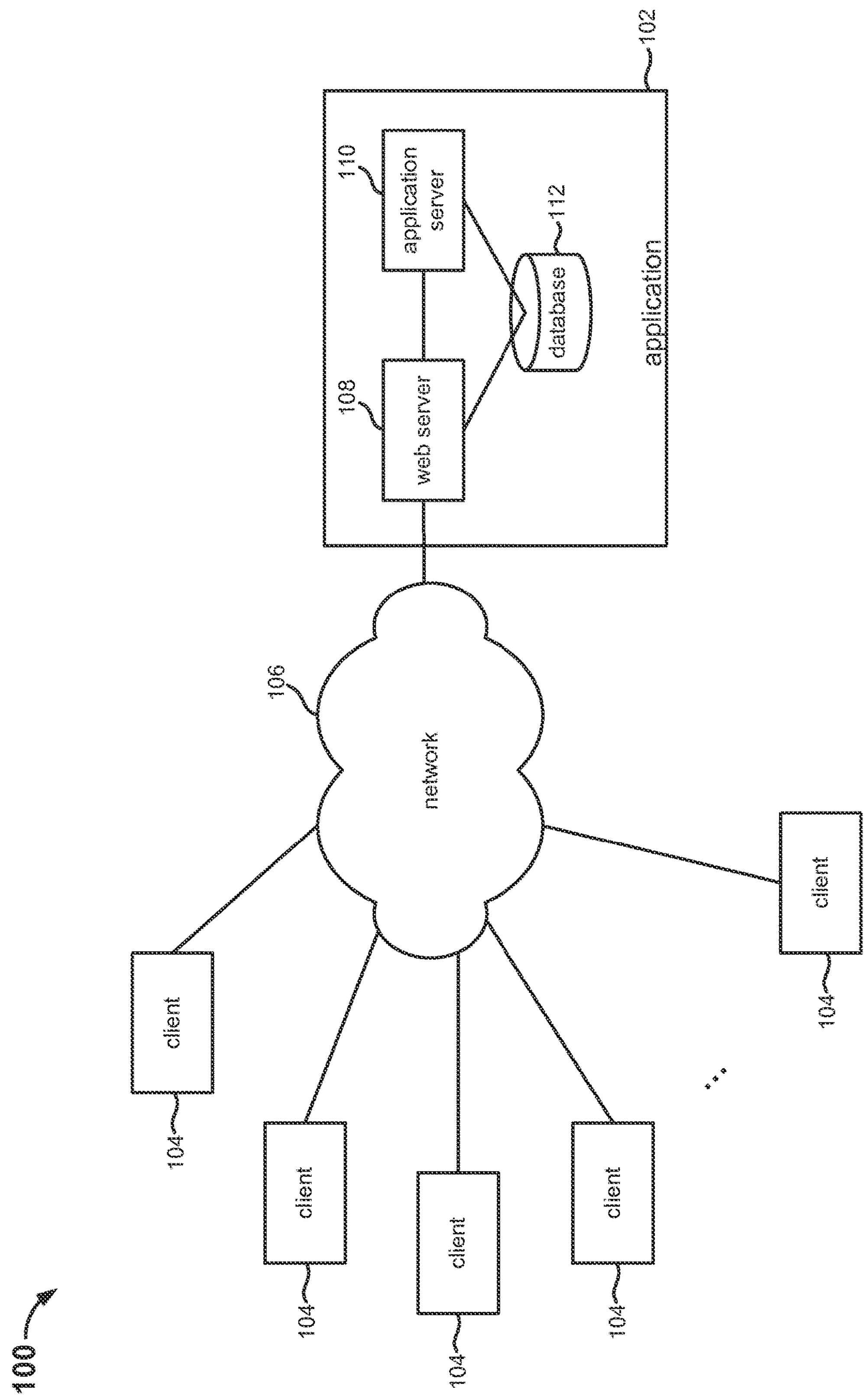
FIG. 1 is a high level block diagram illustrating an embodiment of a network environment in which an application is deployed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for applying application behavior learning to generate capacity forecast models are generally disclosed. As more and more end users start using a deployed application over a period of time, capacity needs to be added to underlying infrastructure components deployed in-premise or on a cloud environment to support an increased load on the application and to continue providing a prescribed quality of service. Each type of end user transaction associated with an application may consume different types and amounts of resources at different points in the underlying infrastructure layers. Indiscriminately adding resources to an entire infrastructure stack comprising an application in response to increased demand or load often results in the addition of resources that are not needed and are thus wasted. Intelligently determining approximate resource consumptions by various transactions comprising an application and scaling infrastructure components accordingly based on maximum expected load as described herein results in a more optimal allocation of resources for implementing the application. Although some of the given examples are described with respect to adding resources to facilitate application growth, the disclosed techniques may be similarly employed to remove extra or unnecessary resources to decrease application capacity if desired. That is, the disclosed techniques may be employed for application performance management to adaptively adjust (i.e., add or remove) infrastructure components to appropriately scale application capacity up or down based on a given or expected demand or load on the application. Moreover, the disclosed techniques may be employed to predict the capacity of given infrastructure components, for example, based on the nature of transactions comprising an application and/or expected end user behavior and to estimate capacity for a given load model.

As used herein, the term "application" refers to a software application, such as an enterprise or business application, implemented by various hardware and software resources comprising an infrastructure stack. Infrastructure components that implement an application may include, for example, web servers, application servers, database servers, etc., which in turn comprise various hardware and software components. The capacity of an application is limited by the capacities of the layers of infrastructure components that implement the application. Various possible end user interactions with an application are sometimes referred to herein as transactions. An application typically allows one or more types of different user transactions, each of which has different effects on the various resources of the infrastructure stack comprising the application. That is, different transactions may consume different types and amounts of application resources. Moreover, a plurality of end users may simultaneously interact with an application via one or more different types of transactions. Such a mix of transactions at any given point in time exerts loads on the various infrastructure components comprising the application, and sufficient component capacities need to be available to service such loads. As load on an application changes and the application itself evolves, infrastructure capacities need to be accordingly adjusted.

FIG. 1 is a high level block diagram illustrating an embodiment of a network environment in which an application is deployed. In network environment 100, application 102 is accessible to one or more clients 104 via network 106, which may comprise any combination of one or more public and/or private networks such as the Internet, a LAN, a WAN, etc. In the given example, application 102 comprises web server 108, application server 110, and database 112. In other embodiments, application 102 may comprise any number and combination of appropriately networked components that implement the functionality of the application. Application 102 may, for example, comprise an e-commerce application such as an online banking or travel application. In the case of a travel application, for instance, examples of transactions associated with the application may include reserving a flight, reserving a hotel, reserving a rental car, etc. The capacity of application 102, i.e., the capacities of various infrastructure components comprising application 102, dictate the performance of the application under various loads on the application by clients 104 at any given point in time.

Figure 2:
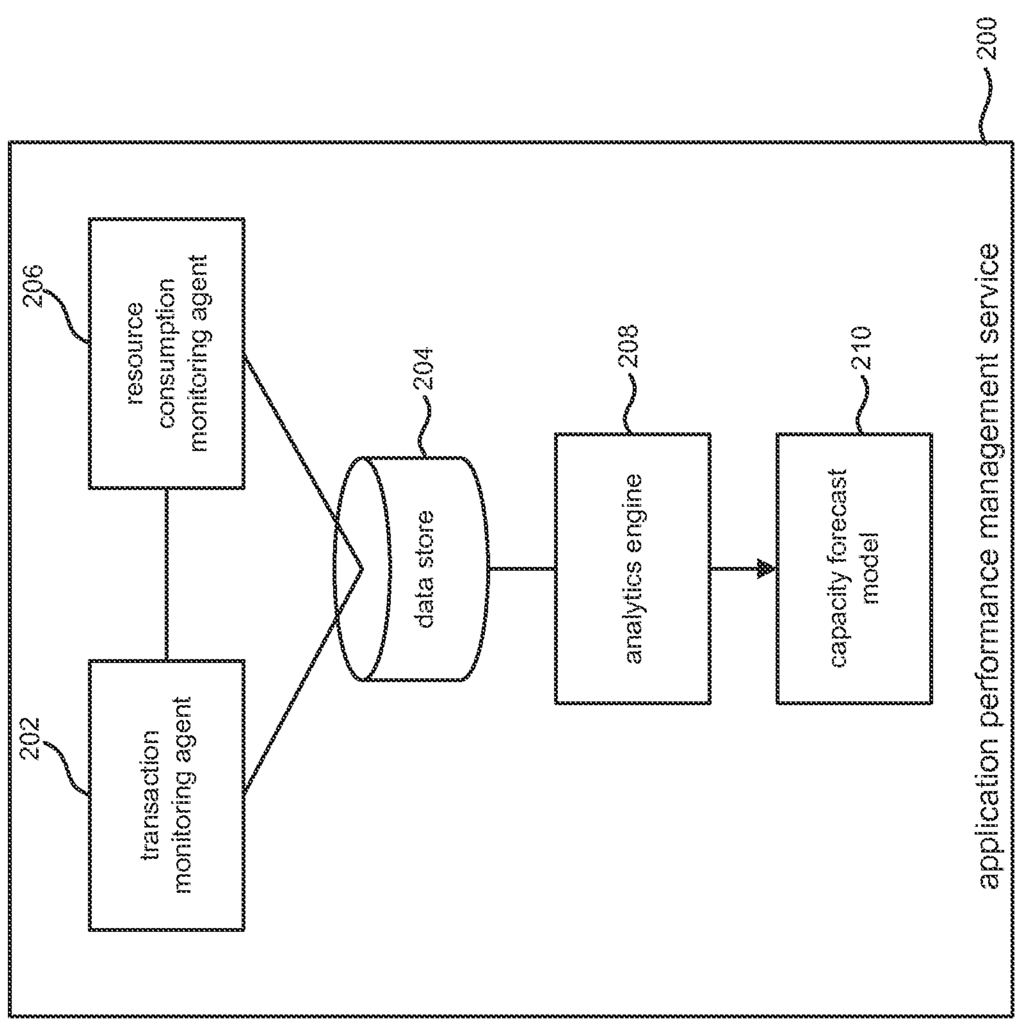
FIG. 2 is a high level block diagram illustrating an embodiment of components comprising a service for application performance management.

FIG. 2 is a high level block diagram illustrating an embodiment of components of a service for application performance management. For example, the described service for application performance management may be provided by a third-party provider and may easily integrate with an application to be monitored and managed, such as application 102 of FIG. 1, without imposing substantial additional load on the application. As depicted, application performance management service 200 includes transaction monitoring agent 202. Transaction monitoring agent 202 facilitates (real time) end user transaction monitoring. More specifically, transaction monitoring agent 202 monitors and records occurrences of transactions and combinations of transactions associated with the monitored application. Data associated with observed transactions is stored for further analysis in data store 204. Resource consumption monitoring agent 206 facilitates monitoring resource consumption metrics, also referred to herein as resource KPIs (Key Performance Indicators), which comprise statistics associated with infrastructure components. More specifically, resource consumption monitoring agent 206 monitors and records values of resource KPIs (e.g., CPU usage, memory usage, IOPS, number of executing threads, number of queries, etc.) at various layers (e.g., web, application, database, etc.) of the underlying infrastructure. Resource KPI values are stored in data store 204. Thus, agents 202 and 206 monitor and record occurrences of one or more transactions and associated KPIs, respectively.

Analytics engine 208 analyzes data recorded by agents 202 and 206 in data store 204. Analytics engine 208 facilitates identification of usage patterns that indicate the manner in which end users conduct transactions on the application. A usage pattern comprises a unique combination of prescribed numbers of occurrences of one or more transactions at a given time or within a given window of time and represents a recurring load on the application infrastructure components. That is, a usage pattern represents simultaneous transaction combinations frequently experienced by the system. Usage patterns may be identified by analytics engine 208, for example, by clustering similar transaction combinations that are observed and recorded by agent 202. In some cases, a usage pattern is represented by prescribed (e.g., average) numbers of each of one or more transactions. In some embodiments, KPIs for various infrastructure resources are recorded by agent 206 when each occurrence of a usage pattern is observed by agent 202. Analytics engine 208 analyzes resource KPIs across a plurality of usage patterns to estimate resource consumption across various points in underlying infrastructure on a per end user transaction basis. Analytics engine 208 then uses these estimates to build and output capacity forecast model 210. In some embodiments, capacity forecast model 210 facilitates the generation of a capacity plan based on given or expected numbers of end user transactions associated with the application.

Figure 3:
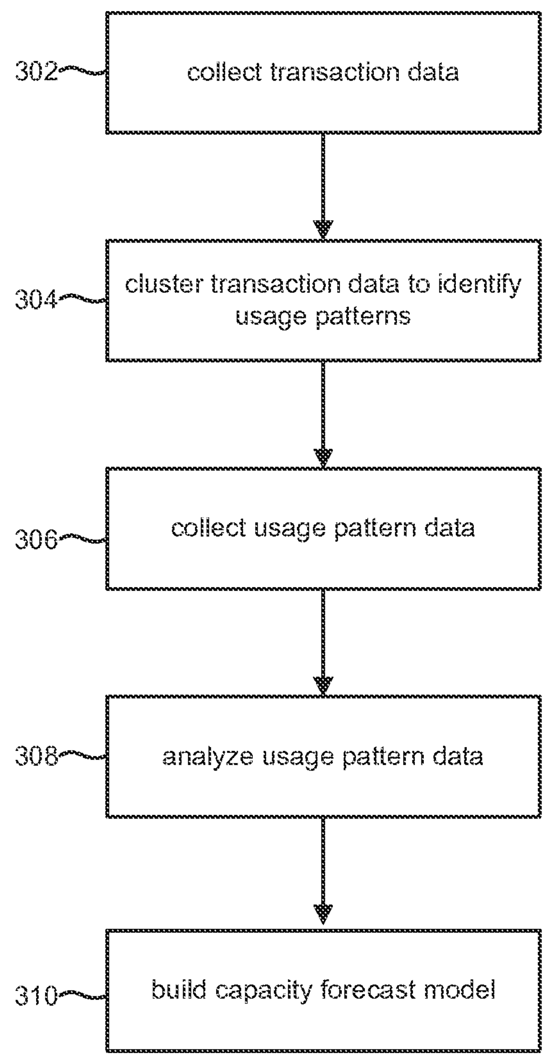
FIG. 3 is a flow chart illustrating an embodiment of a process for generating a capacity forecast model.

FIG. 3 is a flow chart illustrating an embodiment of a process for generating a capacity forecast model. For example, process 300 may be employed by application performance management service 200 of FIG. 2. Process 300 starts at step 302 at which transaction data is collected. For example, transaction data is collected at step 302 by transaction monitoring agent 202. In various embodiments, transaction data may be collected at step 302 over continuous time intervals and/or at discrete sample times. In some embodiments, step 302 comprises observing various states of an application. For example, a state may comprise a set of co-occurring transaction combinations. At step 304, transaction data collected at step 302 is clustered to identify usage patterns. For example, similar transaction loads may be identified and classified as a usage pattern at step 304 by analytics engine 208 using any appropriate clustering algorithm such as the Birch clustering algorithm.

As an example, consider that an application comprises three possible transactions—search (T1), purchase details (T2), and payment (T3)—and that multiple concurrent end users may execute these three transactions. Various states of occurrences of these transactions and/or combinations thereof are observed and recorded at step 302, for example, by transaction monitoring agent 202. The following three usage patterns may be identified at step 304 by analytics engine 208 based on occurrences of similar transaction combinations:

U1: (100T1, 10T2) (101T1, 9T2) (102T1, 11T2) . . . .

U2: (20T1, 3T2) (21T1, 4T2) (22T1, 4T2) . . . .

U3: (50T1, 10T2, 3T3) (51T1, 10T2, 2T3) (52T1, 11T2, 3T3) . . . .

At step 306, usage pattern data is collected. That is, occurrences of usage patterns are detected and recorded, for example, by transaction monitoring agent 202. In some embodiments, step 306 further comprises determining and recording resource KPIs for observed application states. For example, resource KPIs may be recorded at step 306 for a plurality of resources for each occurrence of a usage pattern by resource consumption monitoring agent 206. At step 308, usage pattern data is analyzed, for example, by analytics engine 208. Usage pattern data may be analyzed at step 308 once the usage pattern has been observed to occur several or at least a prescribed number of times. In some embodiments, step 308 includes determining a (e.g., average) transaction combination representing a usage pattern. In the given example, for instance, usage pattern U1 may be represented by transaction combination (101T1, 10T2), which in this case represents an average of the three given observances of usage pattern U1. In some embodiments, step 308 includes analyzing resource KPIs recorded for each resource for each occurrence of a usage pattern. Such an analysis may be employed to determine an average KPI value for a resource for a given usage pattern by averaging KPI values associated with the various occurrences of the usage pattern.

Steps 302-308 of process 300 are employed to learn application behavior and build a database of usage patterns and corresponding resource KPIs. That is, a sizable database of usage patterns and average resource KPI values corresponding to each usage pattern is built using steps 302-308. At step 310, a capacity forecast model (CFM) is built based on the analyzed usage pattern data.

Figure 4:
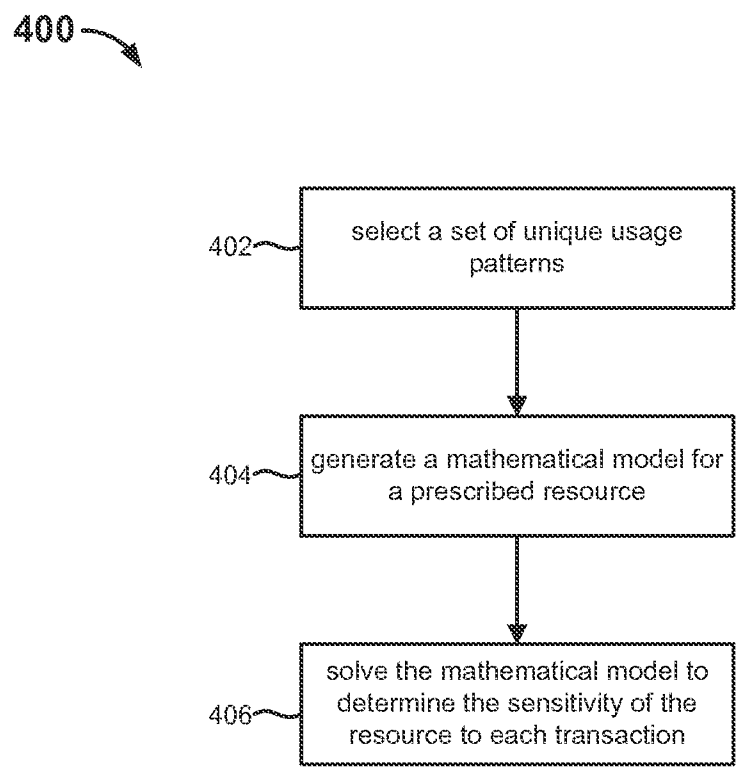
FIG. 4 is a flow chart illustrating an embodiment of a process for generating a capacity forecast model.

FIG. 4 is a flow chart illustrating an embodiment of a process for generating a capacity forecast model. For example, process 400 may be employed at step 310 of process 300 of FIG. 3. Process 400 starts at step 402 at which a prescribed number of unique usage patterns are selected. In some embodiments, a number of unique usage patterns equal to a number of transactions of the application being monitored may be selected at step 402. In various embodiments, usage patterns may be selected at step 402 at random or, for example, based on some criteria such as the number of occurrences of observations of a usage pattern. For instance, a prescribed number of most frequently occurring usage patterns may be selected at step 402. At step 404, a mathematical model is generated for a prescribed resource. For example, the mathematical model of step 404 may comprise treating the set of usage patterns selected at step 402 and corresponding average resource KPI values as a set of simultaneous equations. The mathematical model may include weightings to account for different frequencies of occurrences of each usage pattern. At step 406, the mathematical model generated at step 404 is solved to determine the sensitivity of a resource to each transaction. That is, solving the mathematical model at step 406 yields estimated capacity values of a resource needed for each occurrence of each monitored transaction. The steps of process 400 are repeated for each infrastructure resource, i.e., for each monitored resource KPI, to collectively define the capacity forecast model. Using such a capacity forecast model comprising individual resource sensitivities to each transaction, needed resource capacities may be easily determined based on the expected numbers and kinds of transactions at peak loads.

With respect to the aforementioned example comprising three monitored transactions (T1, T2, T3), process 400 includes selecting three unique usage patterns at step 402. In this example, the selected usage patterns comprise U1, U2, and U3. At step 404, a mathematical model is constructed for a prescribed resource that treats the set of three usage patterns and corresponding average resource KPI values as the following set of simultaneous equations:

$$101T1+10T2=30$$

$$21T1+3.67T2=20$$

$$51T1+10.33T2+2.67T3=40$$

In this example, the resource KPI value of each equation (i.e., 30, 20, 40) comprises the average resource KPI for each usage pattern. As an example, the resource KPI values may represent average percentages of CPU usage for each usage pattern. Solving the above simultaneous equations results in values for T1, T2, and T3, which in this example represent the percentage of CPU usage for each occurrence of each transaction. Similar mathematical models using resource KPI values for other resources are generated and solved to determine the amount of each resource used for each (i.e., a single) occurrence of each transaction. Collectively, the amounts of each resource consumed by a single occurrence of each transaction define the capacity forecast model.

The disclosed techniques provide many interesting features useful for application performance management. For example, the disclosed techniques facilitate automated discovery of mean resource KPI values through usage pattern based performance baselines of an application. Moreover, the disclosed techniques facilitate automated generation of a fine grained capacity forecasting model that works with end user transaction counts as inputs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:

a processor configured to:

observe a plurality of occurrences of combinations of one or more co-occurring transactions of one or more transaction types of an application;

observe one or more corresponding resource consumption metrics associated with one or more application components for each of the plurality of occurrences of combinations;

identify a plurality of unique usage patterns of the application by clustering the occurrences of combinations, wherein the clustering is based on the number of co-occurring transactions of each transaction type observed for each of the occurrences of combinations;

define each of the plurality of unique usage patterns as a combination of prescribed numbers of co-occurring transactions for each of the one or more transaction types, wherein the prescribed numbers of co-occurring transactions are determined by averaging numbers of co-occurring transactions for each transaction type observed over the plurality of occurrences of combinations for that identified unique usage pattern;

generate a mathematical model comprising a set of simultaneous equations, wherein for each simultaneous equation a defined unique usage pattern is set equal to a prescribed resource consumption value observed for that identified unique usage pattern, wherein the prescribed resource consumption value is determined by averaging one of the one or more corresponding resource consumption metrics for the plurality of occurrences of combinations of the corresponding identified unique usage pattern, wherein each simultaneous equation in the set of simultaneous equations is associated with a different defined unique usage pattern, wherein the number of simultaneous equations in the set of simultaneous equations equals the number of observed transaction types of the application;

determine a consumption of an application resource corresponding to the prescribed resource consumption value for each of the one or more transaction types of the application by solving the mathematical model; and determine a capacity of the application resource for a given transaction load based on the determined consumption of the application resource by each of the one or more transaction types; and a memory coupled to the processor and configured to provide instructions to the processor.

2. The system of claim 1, wherein the processor is further configured to collect transaction data.

3. The system of claim 1, wherein the processor is further configured to observe and identify various states of the application.

4. The system of claim 3, wherein a state of the application comprises a combination of a set of co-occurring transaction.

5. The system of claim 1, wherein clustering comprises clustering using a Birch clustering algorithm.

6. The system of claim 1, wherein the processor is further configured to collect usage pattern data.

7. The system of claim 6, wherein collect usage pattern data comprises detect and record occurrences of combinations of the identified unique usage patterns.

8. The system of claim 6, wherein collect usage pattern data comprises determine and record one or more resource consumption metrics for each occurrence of combinations of the identified unique usage patterns.

9. The system of claim 1, wherein the prescribed resource consumption value comprises a mean key performance indicator (KPI) value for the application resource.

10. The system of claim 1, wherein clustering comprises learning behaviors of the application and building a database of identified unique usage patterns and corresponding resource consumption metrics.

11. The system of claim 1, wherein the mathematical model comprises a capacity forecast model.

12. The system of claim 1, wherein an associated mathematical model is generated for each of a plurality of application resources to determine a consumption of each application resource for each type of transaction.

13. The system of claim 1, wherein each identified unique usage pattern represents recurring occurrences of combinations of one or more co-occurring transactions of one or more transaction types.

14. The system of claim 1, wherein the processor is further configured to predict a capacity of the application resource based on an effect of each transaction type on the application resource computed from the determined consumption of the application resource for each transaction type and an expected load on the application.

15. The system of claim 1, wherein the system is associated with a third-party application performance management service.

16. A method comprising:

observing a plurality of occurrences of combinations of one or more co-occurring transactions of one or more transaction types of an application;

observing one or more corresponding resource consumption metrics associated with one or more application components for each of the plurality of occurrences of combinations;

identifying a plurality of unique usage patterns of the application by clustering the occurrences of combinations, wherein the clustering is based on the number of co-occurring transactions of each transaction type observed for each of the occurrences of combinations;

defining each of the plurality of unique usage patterns as a combination of prescribed numbers of co-occurring transactions for each of the one or more transaction types, wherein the prescribed numbers of co-occurring transactions are determined by averaging numbers of co-occurring transactions for each transaction type observed over the plurality of occurrences of combinations for that identified unique usage pattern;

generating a mathematical model comprising a set of simultaneous equations, wherein for each simultaneous equation a defined unique usage pattern is set equal to a prescribed resource consumption value observed for that identified unique usage pattern, wherein the prescribed resource consumption value is determined by averaging one of the one or more corresponding resource consumption metrics for the plurality of occurrences of combinations of the corresponding identified unique usage pattern, wherein each simultaneous equation in the set of simultaneous equations is associated with a different defined unique usage pattern, wherein the number of simultaneous equations in the set of simultaneous equations equals the number of observed transaction types of the application;

determining a consumption of an application resource corresponding to the prescribed resource consumption value for each of the one or more transaction types of the application by solving the mathematical model; and determining a capacity of the application resource for a given transaction load based on the determined consumption of the application resource by each of the one or more transaction types.

17. The method of claim 16, further comprising collecting transaction data.

18. The method of claim 16, further comprising observing and identifying various states of the application.

19. The method of claim 18, wherein a state of the application comprises a combination of a set of co-occurring transactions.

20. The method of claim 16, wherein clustering comprises clustering using a Birch clustering algorithm.

21. The method of claim 16, further comprising collecting usage pattern data.

22. The method of claim 21, wherein collecting usage pattern data comprises detecting and recording occurrences of combinations of the identified unique usage patterns.

23. The method of claim 21, wherein collecting usage pattern data comprises determining and recording one or more resource consumption metrics for each occurrence of combinations of the identified unique usage patterns.

24. The method of claim 16, wherein the prescribed resource consumption value comprises a mean key performance indicator (KPI) value for the application resource.

25. The method of claim 16, wherein clustering comprises learning behaviors of the application and building a database of identified unique usage patterns and corresponding resource consumption metrics.

26. The method of claim 16, wherein the mathematical model comprises a capacity forecast model.

27. The method of claim 16, wherein an associated mathematical model is generated for each of a plurality of application resources to determine a consumption of each application resource for each type of transaction.

28. The method of claim 16, wherein each identified unique usage pattern represents recurring occurrences of combinations of one or more co-occurring transactions of one or more transaction types.

29. The method of claim 16, further comprising predicting a capacity of the application resource based on an effect of each transaction type on the application resource computed from the determined consumption of the application resource for each transaction type and an expected load on the application.

30. The method of claim 16, wherein the method is associated with a third-party application performance management service.

31. A computer program product embodied in a non-transitory computer readable storage medium and comprising instructions for:

observing a plurality of occurrences of combinations of one or more co-occurring transactions of one or more transaction types of an application;

observing one or more corresponding resource consumption metrics associated with one or more application components for each of the plurality of occurrences of combinations;

identifying a plurality of unique usage patterns of the application by clustering the occurrences of combinations, wherein the clustering is based on the number of co-occurring transactions of each transaction type observed for each of the occurrences of combinations;

defining each of the plurality of unique usage patterns as a combination of prescribed numbers of co-occurring transactions for each of the one or more transaction types, wherein the prescribed numbers of co-occurring transactions are determined by averaging numbers of co-occurring transactions for each transaction type observed over the plurality of occurrences of combinations for that identified unique usage pattern;

generating a mathematical model comprising a set of simultaneous equations, wherein for each simultaneous equation a defined unique usage pattern is set equal to a prescribed resource consumption value observed for that identified unique usage pattern, wherein the prescribed resource consumption value is determined by averaging one of the one or more corresponding resource consumption metrics for the plurality of occurrences of combinations of the corresponding identified unique usage pattern, wherein each simultaneous equation in the set of simultaneous equations is associated with a different defined unique usage pattern, wherein the number of simultaneous equations in the set of simultaneous equations equals the number of observed transaction types of the application;

determining a consumption of an application resource corresponding to the prescribed resource consumption value for each of the one or more transaction types of the application by solving the mathematical model; and determining a capacity of the application resource for a given transaction load based on the determined consumption of the application resource by each of the one or more transaction types.

32. The computer program product of claim 31, further comprising instructions for collecting transaction data.

33. The computer program product of claim 31, further comprising instructions for observing and identifying various states of the application.

34. The computer program product of claim 33, wherein a state of the application comprises a combination of a set of co-occurring transactions.

35. The computer program product of claim 31, wherein clustering comprises clustering using a Birch clustering algorithm.

36. The computer program product of claim 31, further comprising instructions for collecting usage pattern data.

37. The computer program product of claim 36, wherein collecting usage pattern data comprises detecting and recording occurrences of combinations of the identified unique usage patterns.

38. The computer program product of claim 36, wherein collecting usage pattern data comprises determining and recording one or more resource consumption metrics for each occurrence of combinations of the identified unique usage patterns.

39. The computer program product of claim 31, wherein the prescribed resource consumption value comprises a mean key performance indicator (KPI) value for the application resource.

40. The computer program product of claim 31, wherein clustering comprises learning behaviors of the application and building a database of identified unique usage patterns and corresponding resource consumption metrics.

41. The computer program product of claim 31, wherein the mathematical model comprises a capacity forecast model.

42. The computer program product of claim 31, wherein an associated mathematical model is generated for each of a plurality of application resources to determine a consumption of each application resource for each type of transaction.

43. The computer program product of claim 31, wherein each identified unique usage pattern represents recurring occurrences of combinations of one or more co-occurring transactions of one or more transaction types.

44. The computer program product of claim 31, further comprising instructions for predicting a capacity of the application resource based on an effect of each transaction type on the application resource computed from the determined consumption of the application resource for each transaction type and an expected load on the application.

45. The computer program product of claim 31, wherein the computer program product is associated with a third-party application performance management service.

* * * * *